United States Patent
Jung et al.

(10) Patent No.: US 9,763,283 B2
(45) Date of Patent: Sep. 12, 2017

(54) METHOD AND APPARATUS FOR WIRELESS LINK CONTROL IN WIRELESS COMMUNICATION SYSTEM SUPPORTING DUAL CONNECTIVITY

(71) Applicant: Pantech Inc., Seoul (KR)

(72) Inventors: Myung Cheul Jung, Seoul (KR); Ki Bum Kwon, Seoul (KR); Jae Hyun Ahn, Seoul (KR); Kang Suk Huh, Seoul (KR)

(73) Assignee: Pantech Inc., Seoul (KR)

( * ) Notice: Subject to any disclaimer, the term of this patent is extended or adjusted under 35 U.S.C. 154(b) by 3 days.

(21) Appl. No.: 14/782,534

(22) PCT Filed: Apr. 4, 2014

(86) PCT No.: PCT/KR2014/002939

§ 371 (c)(1),
(2) Date: Oct. 5, 2015

(87) PCT Pub. No.: WO2014/163436

PCT Pub. Date: Oct. 9, 2014

(65) Prior Publication Data

US 2016/0037579 A1     Feb. 4, 2016

(30) Foreign Application Priority Data

Apr. 5, 2013    (KR) .................. 10-2013-0037776

(51) Int. Cl.
*H04W 76/06* (2009.01)
*H04W 24/04* (2009.01)
(Continued)

(52) U.S. Cl.
CPC ........... *H04W 76/06* (2013.01); *H04W 24/04* (2013.01); *H04W 24/08* (2013.01); *H04W 84/045* (2013.01)

(58) Field of Classification Search
None
See application file for complete search history.

(56) References Cited

U.S. PATENT DOCUMENTS

2011/0250925 A1    10/2011   Han
2012/0202557 A1*   8/2012   Olofsson ............... H04W 24/08
                                                        455/525
(Continued)

FOREIGN PATENT DOCUMENTS

KR    10-2011-0035932    4/2011
KR    10-2011-0039378    4/2011
(Continued)

OTHER PUBLICATIONS

International Search Report mailed Jun. 27, 2014 in International Application No. PCT/KR2014/002939.

*Primary Examiner* — Min Jung
(74) *Attorney, Agent, or Firm* — H.C. Park & Associates, PLC

(57) ABSTRACT

A method and an apparatus for wireless link (radio link) control in a wireless communication system supporting dual connectivity is disclosed. The present invention includes: detecting radio link failure (RLF) of a secondary serving cell provided from a secondary base station, separately from detecting RLF of a primary serving cell provided from a master base station; generating a RLF specifier specifying an occurrence of RLF of the secondary serving cell when RLF of the secondary serving cell is detected; and transmitting the RLF specifier to an RRC connected master base station. A wireless link between a terminal and a master base station and a wireless link between a terminal and a secondary base station can be managed individually when a terminal is dually connected to both the master base station and the secondary base station in a network.

13 Claims, 10 Drawing Sheets

(51) Int. Cl.
*H04W 24/08* (2009.01)
*H04W 84/04* (2009.01)

(56) References Cited

U.S. PATENT DOCUMENTS

| | | | |
|---|---|---|---|
| 2012/0281548 A1 | 11/2012 | Lin et al. | |
| 2013/0188473 A1* | 7/2013 | Dinan | H04W 56/0005 370/216 |
| 2013/0250910 A1* | 9/2013 | Liao | H04W 36/08 370/331 |
| 2013/0258882 A1* | 10/2013 | Dinan | H04W 56/001 370/252 |
| 2014/0295860 A1* | 10/2014 | Kuo | H04W 24/02 455/450 |
| 2014/0328162 A1* | 11/2014 | Jeong | H04W 36/08 370/221 |
| 2015/0249930 A1* | 9/2015 | Andrianov | H04W 24/08 455/423 |

FOREIGN PATENT DOCUMENTS

| | | |
|---|---|---|
| KR | 10-2011-0113484 | 10/2011 |
| WO | 2010/017961 | 2/2010 |

* cited by examiner

METHOD AND APPARATUS FOR WIRELESS LINK CONTROL IN WIRELESS COMMUNICATION SYSTEM SUPPORTING DUAL CONNECTIVITY

CROSS-REFERENCE TO RELATED APPLICATIONS

This application is a National Stage Entry of International Application PCT/KR2014/002939, filed on Apr. 4, 2014, and claims priority from and the benefit of Korean Patent Application No. 10-2013-0037776 filed on Apr. 5, 2013, each of which is hereby incorporated by reference for all purposes as if fully set forth herein.

BACKGROUND

Field

Exemplary embodiments relate to wireless communication, and more particularly, to a method and an apparatus for controlling a radio link in a wireless communication system supporting dual connectivity.

Discussion of the Background Art

Cellular is a concept proposed to overcome limitation of a service area and limitation of a frequency and a subscriber capacity. This is a scheme that provides call coverage by changing a single high-output base station to multiple low-output base stations. That is, a mobile communication service area is divided into several small cells to allocate respective different frequencies to adjacent cells and the same frequency band is used in two cells which are significantly far away from each other and do not interfere with each other to spatially reuse the frequency. Alternatively, a scheme may also be used which divides the mobile communication service area into several small cell units, but allocates the same frequency to adjacent cells, however, controls interference among the cells to be removed.

Meanwhile, particular many communication demands are generated in a specific area such as a hotspot in the cell and receiving sensitivity of radio waves may deteriorate in a specific area such as a cell edge or a coverage hole. With the development of wireless communication technology, small cells, for example, a pico cell, a femto cell, a micro cell, a remote radio head (RRH), a relay, a repeater, and the like are together installed in a macro cell for the purpose of enabling communication in regions such as the hotspot, the cell edge, the coverage hole, and the like. The small cells may be positioned inside or outside the macro cell. In this case, the small cell is positioned at a location which the macro cell does not reach, outdoor, or at an office. The network is called a heterogeneous network (HetNet). In this case, heterogeneous networks need not use different radio access schemes. In a heterogeneous network environment, the macro cell is a cell having relatively large coverage and the small cell such as the femto cell and the pico cell is a cell having relatively small coverage. The macro cell and the small cell may distribute the same traffic or take charge of transmitting traffic of different QoSs. In the heterogeneous environment, coverage overlapping occurs among multiple macro cells and small cells.

In the heterogeneous environment, as one of cell planning techniques for distributing an excessive load or a load requiring a specific QoS to the small cell without a handover procedure and efficiently transmitting data, a dual connectivity technique is introduced. In terms of a user equipment, the dual connectivity may be a technique for providing a more efficient scheme in terms of transmission/reception transmission rate. For example, the user equipment may transmit/receive services from two or more serving cells. In this case, the respective serving cells may belong to different base stations. As described above, at the region where the coverage of the macro cell and the coverage of the small cell overlap with each other, the user equipment may be simultaneously connected (signaling connection) to the macro cell and the small cell or simultaneously use (user traffic transmission) the macro cell and the small cell. This may be referred to as the dual connectivity. That is, the user equipment are wirelessly connected with two or more different base stations (for example, a macro base station including the macro cell and a small base station including the small cell) through different frequency bands or the same frequency band based on the dual connectivity technique to transmit/receive the services. Alternatively, the user equipment is wirelessly connected with two or more different base stations through the same frequency band to transmit/receive the services.

Since the user equipment supporting the dual connectivity may simultaneously use the macro cell and the small cell, two radio links can be maintained. In one single connectivity situation in the related art, the user equipment may monitor one radio link and when a problem occurs in the corresponding link, a radio link failure (RLF) may be declared. However, in the dual connectivity to maintain two radio links, even though a problem occurs in one radio link of the user equipment, the other radio link can still be available. When the problem occurs in one radio link, it is not preferable in terms of network performance to unconditionally declare the radio link failure and perform a radio resource control (RRC) reestablishment procedure even though the other radio link is available. Accordingly, a radio link control method considering the dual connectivity is required.

SUMMARY

An exemplary embodiment provides a method and an apparatus for radio link control in a wireless communication system supporting dual connectivity.

An exemplary embodiment also provides a method and an apparatus for radio link control when a problem occurs in a radio link in a wireless communication system supporting dual connectivity.

An exemplary embodiment also provides a method and an apparatus for radio link control according to a base station in a radio link in a wireless communication system supporting dual connectivity.

An exemplary embodiment also provides a method and an apparatus for radio link control when a problem occurs in a radio link in a wireless communication system supporting dual connectivity.

An exemplary embodiment also provides a method and an apparatus for radio link control for each connectivity in a wireless communication system supporting dual connectivity.

In an aspect, a user equipment for performing radio link control in a wireless communication system supporting dual connectivity is provided. The user equipment includes: a processor detecting a radio link failure (RLF) for a secondary serving cell provided by a secondary base station (secondary eNB, SeNB) and generating an RLF indicator indicating that the RLF for the secondary serving cell; and a transmitting unit transmitting the RLF indicator to a master base station (master eNB, MeNB) connected through radio resource control (RRC).

In another aspect, a master base station for performing radio link control in a wireless communication system supporting dual connectivity is provided. The base station includes: a receiving unit receiving an RLF indicator indicating that a radio resource failure for a secondary serving cell provided to a user equipment occurs from a secondary base station from the user equipment; a processor generating an RRC connection reconfiguration message including secondary serving cell deconfiguration information for the secondary serving cell based on the RLF indicator; and a transmitting unit transmitting the RRC connection reconfiguration message to the user equipment.

In yet another aspect, a method for radio link control by a user equipment which is dually connected to a master base station and a secondary base station is provided. The method includes: detecting a radio resource failure (RLF) for a secondary serving cell provided by a secondary base station; generating an RLF indicator indicating that the RLF for the secondary serving cell occurs when the RLF for the secondary serving cell is detected; and transmitting the RLF indicator to the master base station connected through radio link control (RRC).

According to an exemplary embodiment, under a situation in which dual connectivity between a macro cell and a small cell on a network, a radio link between a user equipment and a macro cell and the radio link between small cells can be individually managed.

According to an exemplary embodiment, even when a problem occurs in one radio link, a user equipment immediately declares an RLF or can perform data transmission/reception through the other available radio link without performing an RRC reestablishment procedure an RRC reestablishment procedure.

DETAILED DESCRIPTION OF THE ILLUSTRATED EMBODIMENTS

Figure 1:
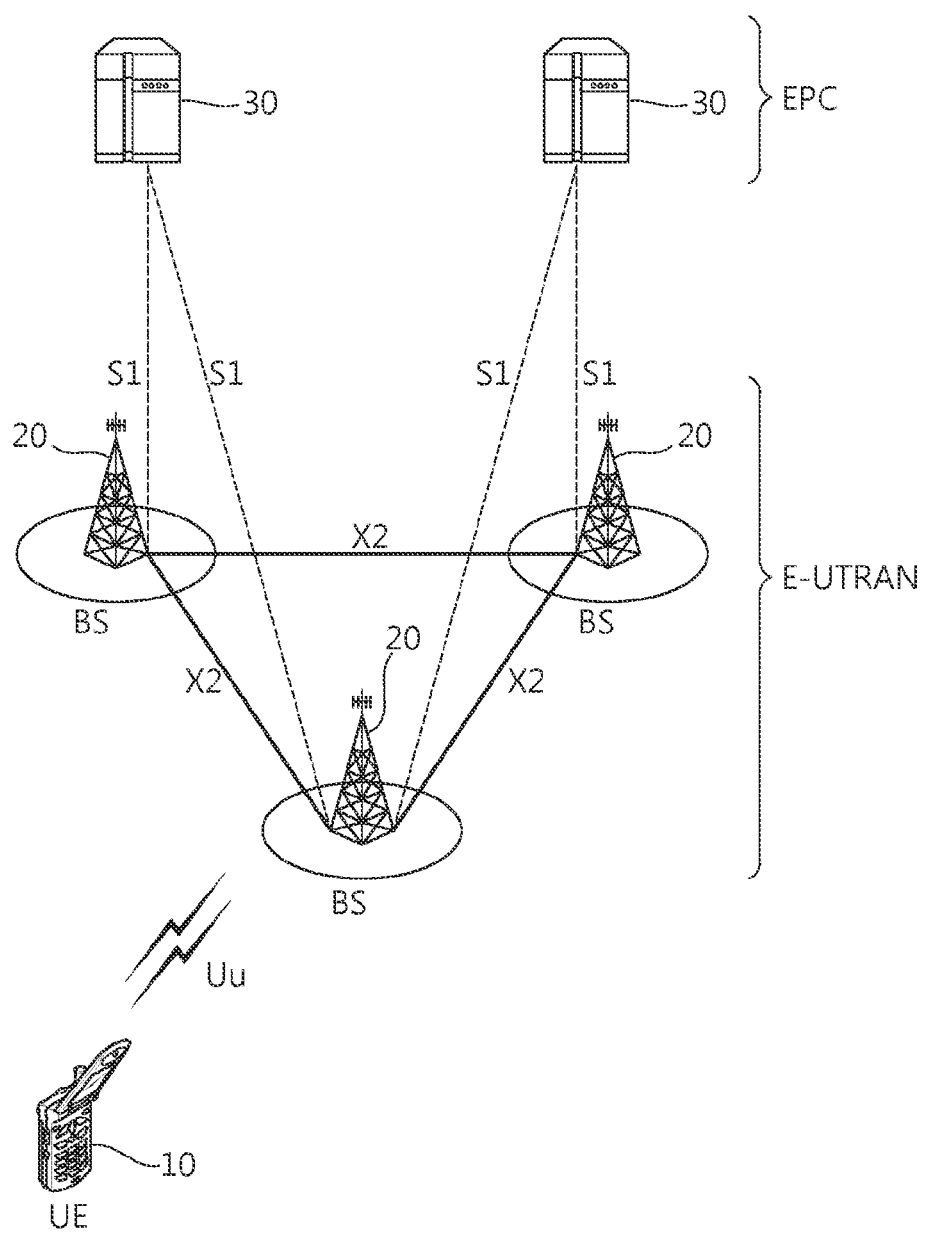
FIG. 1 illustrates a wireless communication system to which an exemplary embodiment is applied.

Herein, some embodiments will be described in detail with reference to the accompanying drawings. When reference numerals refer to components of each drawing, it is noted that although the same components are illustrated in different drawings, the same components are referred to by the same reference numerals as possible. In describing the embodiments, when it is determined that the detailed description of the known art related to an exemplary embodiment may obscure the gist of the present inventive concept, the detailed description thereof will be omitted.

Further, the specification primary describes a communication network, and a task performed in the communication network may be achieved during a process controlling the network and transmitting data in a system (for example, a base station) that controls the corresponding communication network or the task may be achieved in user equipment linked to the corresponding network.

FIG. 1 illustrates a wireless communication system to which an exemplary embodiment is applied. This may be a network structure of an evolved-universal mobile telecommunication system (E-UMTS). The E-UMTS may also be referred to as a long term evolution (LTE) or LTE-A (advanced) system. The wireless communication system is widely placed in order to provide various communication services such as voices, packet data, and the like.

Meanwhile, a multiple access technique applied to the wireless communication system is not limited. The wireless communication system may adopt various multiple access techniques including code division multiple access (CDMA), time division multiple access (TDMA), frequency division multiple access (FDMA), orthogonal frequency division multiple access (OFDMA), single carrier-FDMA (SC-FDMA), OFDM-FDMA, OFDM-TDMA, and OFDM-CDMA.

Herein, a time division duplex (TDD) scheme in which transmission is performed by different times or a frequency division duplex (FDD) scheme in which transmission is performed by using different frequencies may be used for the uplink transmission and the downlink transmission.

Referring to FIG. 1, E-UTRAN includes a base station (BS) 20 which provides a control plane and a user plane to user equipment (UE) 10. The user plane is a protocol stack for user data transmission and the control plane is a protocol stack for control signal transmission. The UE 10 may be fixed or have mobility, and may be referred to as other terms such as a mobile station (MS), an advanced MS (AMS), a user equipment (UT), a subscriber station (SS), a wireless device, and the like.

The base station 20 generally indicates a station that communicates with the UE 10 and may be called other terms such as an evolved-NodeB (eNodeB), a base transceiver system (BTS), an access point, a femto base station (eNB), a home base station (eNodeB), a relay, and the like. The base station 20 may provide at least one cell to the UE. The cell may mean a geographical area providing a communication service or a specific frequency band. The cell may mean a downlink frequency resource and an uplink frequency resource. Alternatively, the cell may mean a combination of the downlink frequency resource and an optional uplink frequency resource.

The BSs 20 may be connected to each other through an X2 interface. The BS 20 is connected with an evolved packet core (EPC) 30 through an S1 interface, and more particularly, connected with a mobility management entity (MME)

through an S1-MME and a serving gateway (S-GW) through an S1-U. The S1 interface transmits and receives operation and management (OAM) information for supporting movement of the UE 10 by exchanging a signal with the MME.

The EPC 30 is constituted by the MME, the S-GW, and a packet data network-gateway (P-GW). The MME has access information of the UE or information regarding the capacity of the UE, and the information is primarily used in mobility management of the UE. The S-GW is a gateway having the E-UTRAN as an end point, and the P-GW is a gateway having a packet data network (PDN) as an end point.

The E-UTRAN and the EPC 30 are integrated to be called an evolved packet system (EPS) and the entirety of a traffic flow from a radio link through which the UE 10 is connected to the base station 20 to the PDN connected to a service entity operates based an Internet protocol (IP).

A radio interface between the UE and the base station is referred to as a Uu interface. Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

A physical (PHY) layer provides an information transfer service to a higher layer by using a physical channel. The physical layer is connected with a medium access control (MAC) layer which is a higher layer through a transport channel. Data move between the MAC layer and the PHY layer through the transport channel. The transport channel is classified according to how the data is transmitted through a radio interface with any characteristic. In addition, data move between different PHY layers, that is, the PHY layers of the transmitter and the receiver through the physical channel. The physical channel may be modulated by an orthogonal frequency division multiplexing (OFDM) scheme, and use a time and a frequency as the radio resource. There are some physical channels. A physical downlink control channel (PDCCH) notifies resource allocation of a paging channel (PCH) and a downlink shared channel (DL-SCH) and hybrid automatic repeat request (HARQ) information associated with the DL-SCH to the UE. The PDCCH may transport an uplink grant for notifying resource allocation of uplink transmission to the UE. A physical control format indicator channel (PCFICH) notifies the number of OFDM symbols used in the PDCCHs to the UE and is transmitted every subframe. A physical Hybrid ARQ Indicator Channel (PHICH) transports an HARQ ACK/NACK signal which is a response to the uplink transmission. A physical uplink control channel (PUCCH) transports uplink control information such as an HARQ ACK/NACK signal, a scheduling request, and a CQI for downlink transmission. A physical uplink shared channel (PUSCH) transports an uplink shared channel (UL-SCH).

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel. The logical channel may be divided into a control channel for transporting control area information and a traffic channel for transporting user area information.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

A function of a packet data convergence protocol (PDCP) layer in the user plane includes transfer, header compression, and ciphering of the user data. A function of the PDCP layer in the control plane includes transferring and ciphering/integrity protection of control plane data.

The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network. The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message and an NAS message in the control plane, and the DRB is used as a path for transporting user data in the user plane.

A non-access stratum (NAS) layer positioned above the RRC layer performs functions such as a session management and a mobility management.

When RRC connection is established between the RRC layer of the UE and the RRC layer of the E-UTRAN, the UE is in an RRC connected state, and if not, the UE is in an RRC idle mode.

In a heterogeneous network environment in which the macro cells and the small cells are together placed, since the small cell provides the service with respect to a smaller area than the macro cell, the small cell is more advantageous than the macro cell in terms of a throughput which may be provided to a single user equipment. However, in the related art, although the UE that is connected to the macro cell once is positioned in the service area of the small cell, the UE may not receive the service from the small cell without performing the handover. Further, when the UE is moving, although the UE is connected to the small cell through the handover, and the like, since the coverage of the small cell is small, the handover may frequently occur and there is a problem in that it is not preferable in terms of network efficiency.

Accordingly, as one of cell planning techniques for distributing an excessive load or a load requiring a specific QoS to the small cell without a handover procedure and efficiently transmitting data, a dual connectivity technique is introduced. The dual connectivity technique may be a technique for providing a more efficient scheme in terms of transmission/reception transmission rate in terms of the UE. For example, the UE may transmit/receive services from two or more serving cells. In this case, the respective serving cells may belong to different base stations. The UE are wirelessly connected with two or more different base stations (for example, a macro base station constituting the macro cell and a small base station constituting the small cell) through different frequency bands based on the dual connectivity technique to transmit/receive the services.

Alternatively, the UE is wirelessly connected with two or more different base stations through the same frequency band to transmit/receive the services. In this case, the macro cell and the macro base station may be called a master cell and a master base station (Master eNB, MeNB) and the small cell and the small base station may be called a secondary cell and a secondary base station (Secondary eNB, SeNB). In this case, a primary serving cell (PCell) which may be constituted in the existing carrier aggregation (CA) scheme may be constituted in the macro base station (alternatively, the master base station). Meanwhile, only a secondary serving cell (SCell) may be constituted in the small base station (alternatively, the secondary base station). A serving cell group (master cell group) provided by the master base station is referred to as MCG and a serving cell group (secondary cell group) provided by the secondary base station is referred to as SCG.

Since the user equipment supporting the dual connectivity may simultaneously use the macro cell and the small cell, two radio links may be maintained. In one single connectivity situation in the related art, the user equipment may monitor one radio link and when a problem occurs in the corresponding link, a radio link failure (RLF) may be declared. However, in the dual connectivity to maintain two radio links, even though a problem occurs in one radio link of the user equipment, the other radio link may still be available. When the problem occurs in one radio link, it is not preferable in terms of network performance to unconditionally declare the radio link failure and perform a radio resource control (RRC) reestablishment procedure even though the other radio link is available. Accordingly, a radio link control method considering the dual connectivity is required.

Hereinafter, a case in which the radio link failure (RLF) occurs will be described. The occurrence of the RLF means a state in which a status of the radio link deteriorates, and as a result, it is difficult to receive a message. The RLF may occur due to a coverage hole of the corresponding base station or a channel status which deteriorates during the handover. For example, the RLF may be determined based on a receiving rate of a physical downlink control channel (PDCCH). Since it is difficult to receive the message, when the RLF occurs, the UE attempts to solve the RLF by a method such as RRC connection reestablishment or cell reselection. A detailed example thereof will be described below.

1. In case of downlink physical layer failure (out-of-sync)

The UE performs radio link monitoring (RLM). The RLM means that the UE which is in an RRC connection mode means that the UE monitors a downlink link quality in the serving cell. The UE compares the measured downlink link quality with an out-of-sync threshold Qout and in-sync Qin to estimate a radio link quality. Values of Qout and Qin correspond to block error rate (BLER) for a down control channel (PDCCH). The block error rate may be a rate at which the PDCCH may not be decoded. For example, Qout may be determined as 10% BLER and Qin may be determined as 2% BLER.

The UE measures a link quality through the RLM, and as a result, when a value smaller than a predetermined threshold Qout is measured, the out-of-sync is generated and when the out-of-sync is consecutively generated at the predetermined number of times, the UE operates an RLF timer. When the RLF timer expires, the RLF is generated.

Figure 2:
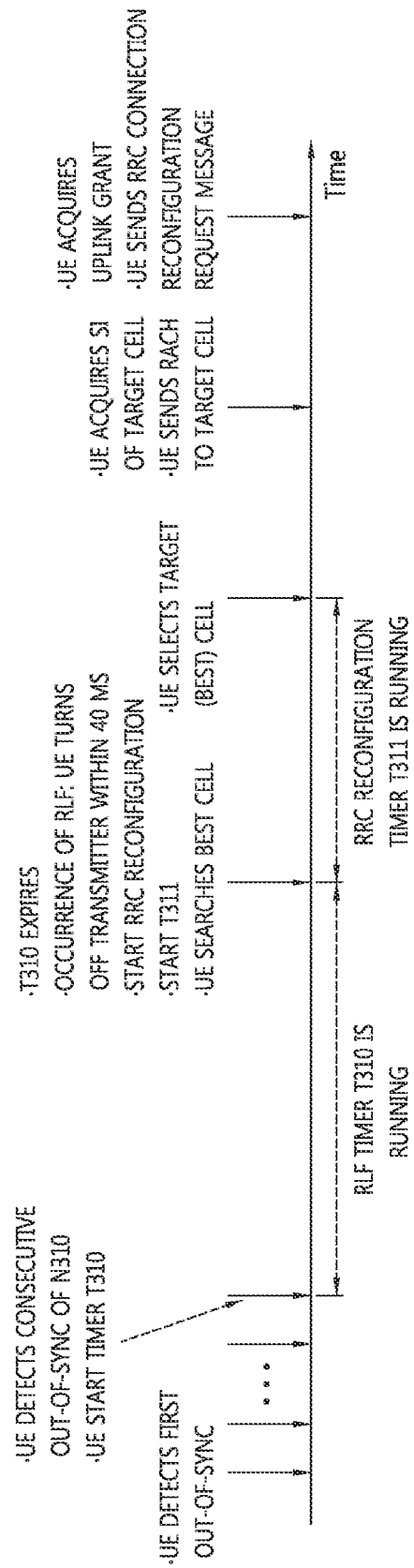
FIG. 2 illustrates radio link monitoring, an RLF, and an RRC connection reestablishment procedure.

FIG. 2 illustrates radio link monitoring, an RLF, and an RRC connection reestablishment procedure.

Referring to FIG. 2, the UE monitors the radio link and detects first out-of-sync. When consecutive out-of-syncs are generated as many as the number of N310s, the UE starts T310. Herein, the N310 represents the maximum number of 'out-of-sync' indications which the UE receives through a lower layer. The T310 represents a physical problem detection timer. The T310 may be called the RLF timer. The T310 may stop when the UE receives the consecutive in-sync indications from the lower layer, when the handover procedure is triggered, or when the RRC connection reestablishment procedure is initiated.

When the T310 expires, the RLF occurs. That is, the UE declares the RLF. When the RLF occurs, the UE turns off a transmitter within 40 ms and starts the RRC reestablishment procedure. In this case, the UE starts the timer T311 and searches a best cell in order to perform the cell reselection. Herein, the T311 is a cell reselection timer.

The UE selects a target (best) cell and acquires system information (SI) in the selected target cell. In addition, the UE sends a random access channel (RACH) to the target cell in order to acquire uplink synchronization.

Thereafter, when the UE acquires a UL grant, the UE sends an RRC connection reestablishment request message to the target cell.

2. In case of reaching the maximum retransmission number of times of protocol data unit (RLC PDU)

The RLF occurs even in case of reaching the maximum retransmission number of times on the RLC. The RLC may determine whether an RLC acknowledged mode data (AMD) PDU is transmitted through an automatic repeat request (ARQ) operation. Basically, the UE has an RLC entity and transmits and receives the RLC PDU to and from the RLC entity of the base station. An acknowledged mode (AM) RLC entity is constituted by a transmission side and a receiving side. The transmission side of the RLC entity may receive negative acknowledgement (NACK) indicating notification of reception failure of the AMD PDU (alternatively, a portion of the AMD PDU) in a peer AM RLC entity through a status PDU from the peer AM RLC entity. The transmission side of the RLC entity considers the AMD PDU as a retransmission target when a sequence number of the corresponding AMD PDU belongs to a predetermined range (VT(A)). In this case, the transmission side of the AM RLC increments a retransmission count RETX_COUNT from 0. The transmission side of the AMC RLC entity indicates, to the higher layer, that the retransmission count reaches the maximum retransmission which is equal to a predetermined maximum retransmission threshold maxRetxThreshold.

When the UE receives the indication representing that the retransmission count reaches the maximum retransmission, the UE declares the RLF and thereafter, perform the RRC connection reestablishment process.

Meanwhile, the description of the RLF is an example and exemplary embodiments are not applied only to the RLF by the cause and besides, an exemplary embodiment may be applied even to a situation in which the RLF occurs by other procedures.

In the related art, the UE transmits and receives traffic through the serving cell in one connection mode. Accordingly, one radio link exists and the UE monitors one radio link and evaluates the link quality and when the link quality deviates from a predetermined criterion, the UE may declare the RLF. However, when the UE configures the dual connectivity through the macro cell and the small cell, the UE further uses other links other than one radio link.

Hereinafter, the dual connectivity situation will be described.

The UE may receive services through different frequency bands from the small base station including only at least one small cell and the macro base station including only at least one macro cell. A base station having low transmission power such as the small base station is also referred to as a low power node (LPN). The RRC for maintaining the connection mode with the UE may exist in the macro base station or the small base station. In contents to be described below, it is assumed that the RRC for maintaining the connection mode with the UE exists in the macro base station.

Figure 3:
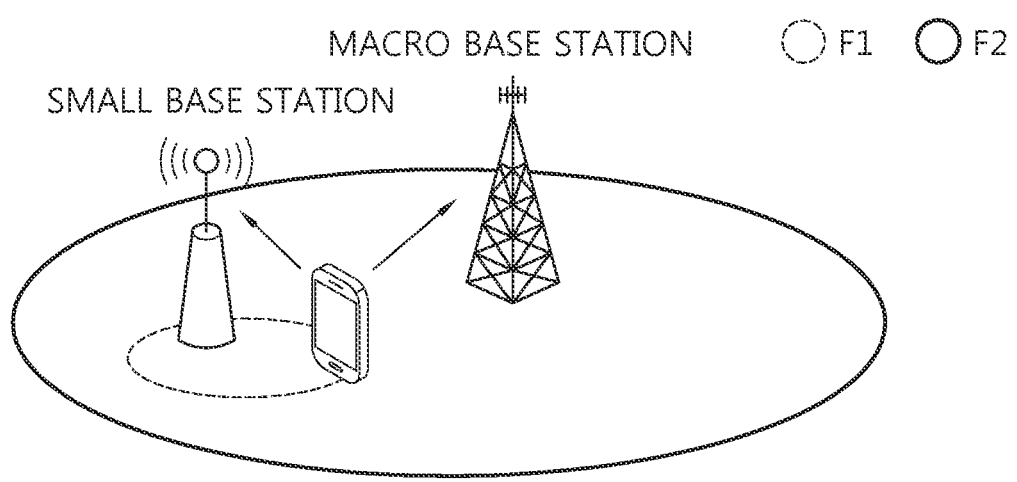
FIG. 3 illustrates one example of a dual connectivity situation of UE applied to an exemplary embodiment.

FIG. 3 illustrates one example of a dual connectivity situation of UE applied to an exemplary embodiment.

Referring to FIG. 3, an F2 frequency band is allocated to the macro base station and an F1 frequency band is allocated to the small base station. The UE may transmit/receive the service from the macro base station through the macro cell using the F2 frequency band and transmit/receive the service from the small base station through the small cell using the F1 frequency band. As such, the UE supporting the dual connectivity may simultaneously use the macro cell of the macro base station and the small cell of the small base station and since the radio link is constituted between the UE and the macro base station (alternatively, the macro cell) and between the UE and the small base station (alternatively, the small cell), individual controlling the radio link is required.

Accordingly, hereinafter, an exemplary embodiment proposes the method for radio link control considering the dual connectivity. In the UE, the RRC connection may be constituted through the radio link with respect to the macro cell or the small cell. Hereinafter, in the UE of which the state (the RRC exists in the macro base station) in which the RRC connection is configured through the radio link of the macro cell is described, the dual connectivity of the macro cell and the small cell is configured and the UE may monitor both the radio link of the macro cell and the radio link of the small cell. The UE may individually perform and manage retransmission of the RLC PDU to the macro cell and retransmission of the RLC PDU to the small cell.

The UE may determine that a problem occurs in the radio link of the macro cell. For example, the UE may determine whether the RLF situation occurs through monitoring the radio link of the macro cell and determine whether the RLF situation occurs through the RLC PDU retransmission count for the macro cell. In this case, the UE may declare the RLF and perform the RRC reestablishment procedure.

The UE may determine that a problem occurs in the radio link of the small cell. For example, the UE may determine whether the RLF situation occurs through monitoring the radio link of the small cell and determine whether the RLF situation occurs through the RLC PDU retransmission count for the small cell. Although the RLF situation occurs in the radio link of the small cell, the radio link of the macro cell may still maintain a good quality. In this case, the UE declare the radio link (that is, the radio link failure of the small cell) for the small cell without declaring a general RLF. Herein, the radio link failure for the small cell may mean that the corresponding small cell is not available for data transmission/reception any longer. The UE according to an exemplary embodiment may perform the following operation when the radio link failure situation for the small cell occurs as described above.

As one example, the UE may stop uplink transmission to the small cell based on the radio link failure for the small cell. The reason is that in the case of the radio link failure for the small cell, when the UE performs the uplink transmission through the radio link of the small cell, the uplink transmission may serve as interference in the other cell. For example, when the uplink grant is transmitted to the UE through cross scheduling for the small cell in the macro cell, the UE may receive the uplink grant for the small cell even though the problem occurs in the radio link of the small cell and perform the uplink transmission based on the received uplink grant. When the uplink transmission to the small cell stops, the UE may stop uplink transmission of the PUSCH, the PUCCH, the SRS, and the like.

As another example, the UE may deactivate the small cell based on the radio link failure for the small cell. In this case, the UE may deactivate the small cell without a separate deactivation indicator from the base station.

As yet another example, the UE and the macro base station may deconfigure the small cell based on the radio link failure for the small cell.

Figure 4:
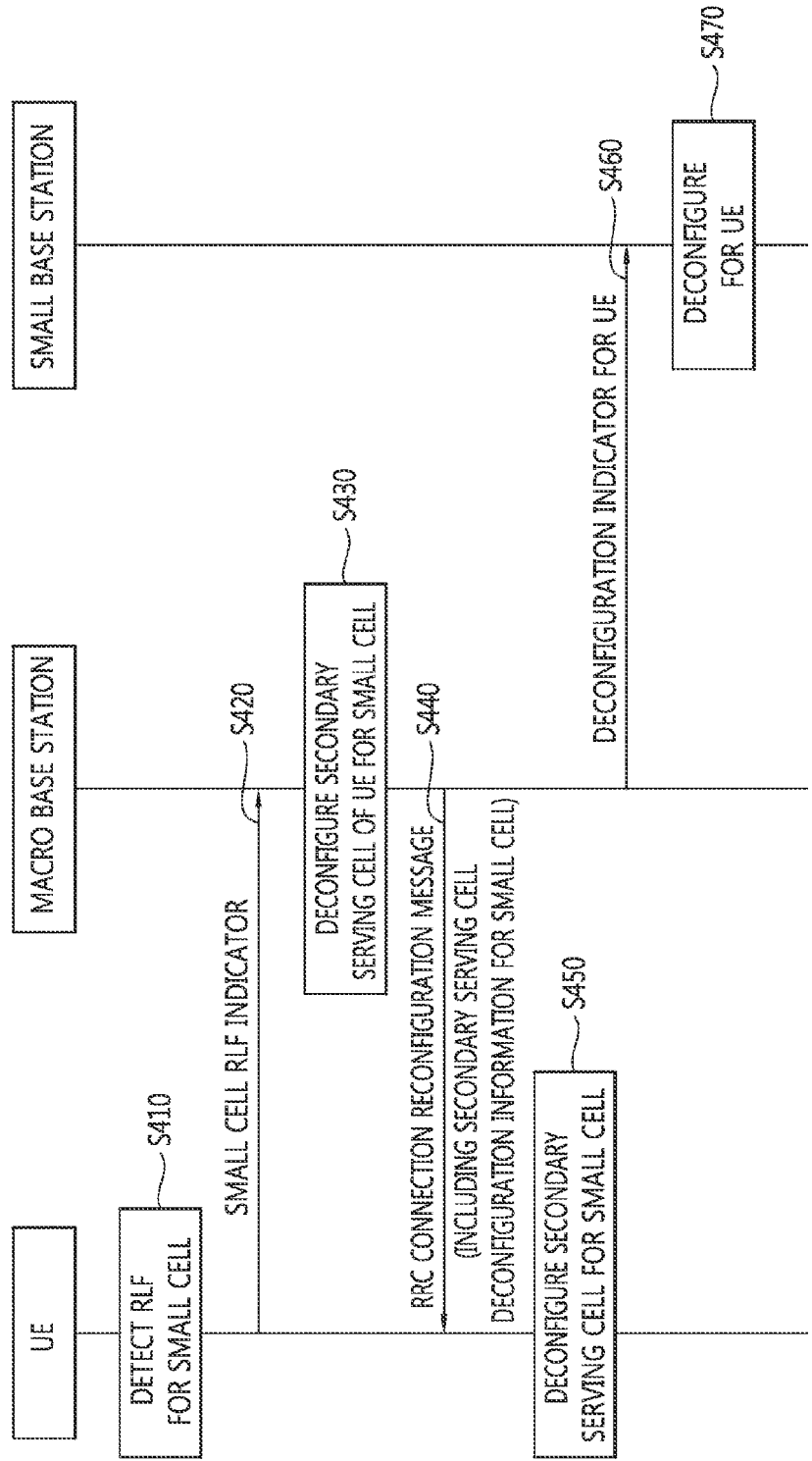
FIG. 4 illustrates an example of deconfiguring, when a radio link failure occurs in a small cell, the corresponding small cell according to an exemplary embodiment.

FIG. 4 illustrates an example of deconfiguring, when a radio link failure occurs in a small cell, the corresponding small cell according to an exemplary embodiment. It is assumed that the macro cell constituted in the macro base station is the primary serving cell and the small cell constituted in the small base station is the secondary serving cell. In the UE, the dual connectivity is configured through the macro cell and the small cell.

Referring to FIG. 4, the US detects the RLF (that is, the small cell RLF) for the small cell. As one example, the UE may determine whether a small cell RLF situation occurs through monitoring the radio link for the small cell. As another example, the UE may determine whether the small cell RLF situation occurs through the RLC PDU retransmission count for the small cell.

The UE transmits the small cell RLF indication to the macro base station (S420). The small cell RLF indicator is information indicating that the RLF occurs in the small cell radio link. The small cell RLF indicator may be just a flag notifying that the RLF occurs in the small cell. Alternatively, the small cell RLF indicator may further include various pieces of information associated with the small cell RLF.

The small cell RLF indicator may be transmitted through an RRC dedicated message. For example, the small cell RLF indicator is included in a UE assistance information message (UEAssistanceInformation message) to be transmitted. In this case, as one example, the UE assistance information message may include the following syntax.

TABLE 1

| UEAssistanceInformation { | |
|---|---|
|     RLFInfo | SmallCellStatus |
|     SmallCellInfo | SmallCellId; |
| } | |
| SmallCellStatus | {RLF, non-RLF} (or {RLF}) |
| SmallCellId | CellId; |

Referring to Table 1, the UE assistance information message may include an RLFinfo field and a SmallCellInfo field. The RLFinfo field may include SmallCellStatus information indicating RLF status information for the small cell. As one example, the SmallCellStatus information may indicate the RLF or a non-RLF. As another example, the SmallCellStatus information is the RLF when the corresponding information exists and the SmallCellStatus information is not the RLF when the corresponding information does not exist. The SmallCellInfo may include a cell ID value for distinguishing the small cell. In this case, the cell IDCellId value may be a physical cell ID (PCI) value, or the like.

The macro base station deconfigures the secondary serving cell (of the UE) for the small cell (S430). In this case, the macro base station reconfigures the RRC related parameter at a macro base station side in order to deconfigure the secondary serving cell for the small cell.

The macro base station transmits an RRC connection reconfiguration message including secondary cell deconfiguration information for the small cell to the UE (S440).

The UE deconfigures the secondary cell for the small cell at a UE side based on the secondary serving cell deconfiguration information for the small cell included in the RRC connection reconfiguration message (S450). In this case, the UE reconfigures the RRC related parameter based on the secondary serving cell deconfiguration information for the small cell.

The macro base station indicates the small base station to remove the configuration (alternatively, link) for the UE (S460). In this case, a deconfiguration indicator for the UE is included in a UE deconfiguration message to be transmitted.

The UE deconfiguration message includes the deconfiguration indicator for the UE and an ID for the UE to perform an operation of deleting a context for the corresponding UE by indicating specific UE not to use the corresponding small cell any longer. The UE deconfiguration message may be a message defined on the Xa interface determined in the macro base station and the small cell base station. A structure is provided in which a source base station and a target base station send and receive the message to and from each other on an X2 interface between LTE base stations in the related art. The message may be transmitted in a similar method as X2 even between the macro base station and the small cell base station.

The UE deconfiguration message may be configured as follows as one example.

TABLE 2

UEDeconfiguration
{
    UEIdInfo;
}

Referring to Table 2, the UE deconfiguration message includes UE ID information (UEIdInfo). The UE ID information indicates an ID of the UE that detects the RLF for the small cell. The UE deconfiguration message is transmitted from the macro base station to the small base station.

The small base station deletes context information for the UE (S470). The small base station that receives the UE deconfiguration message determines that information on the UE is not valid any longer to remove the corresponding UE context.

Figure 5:
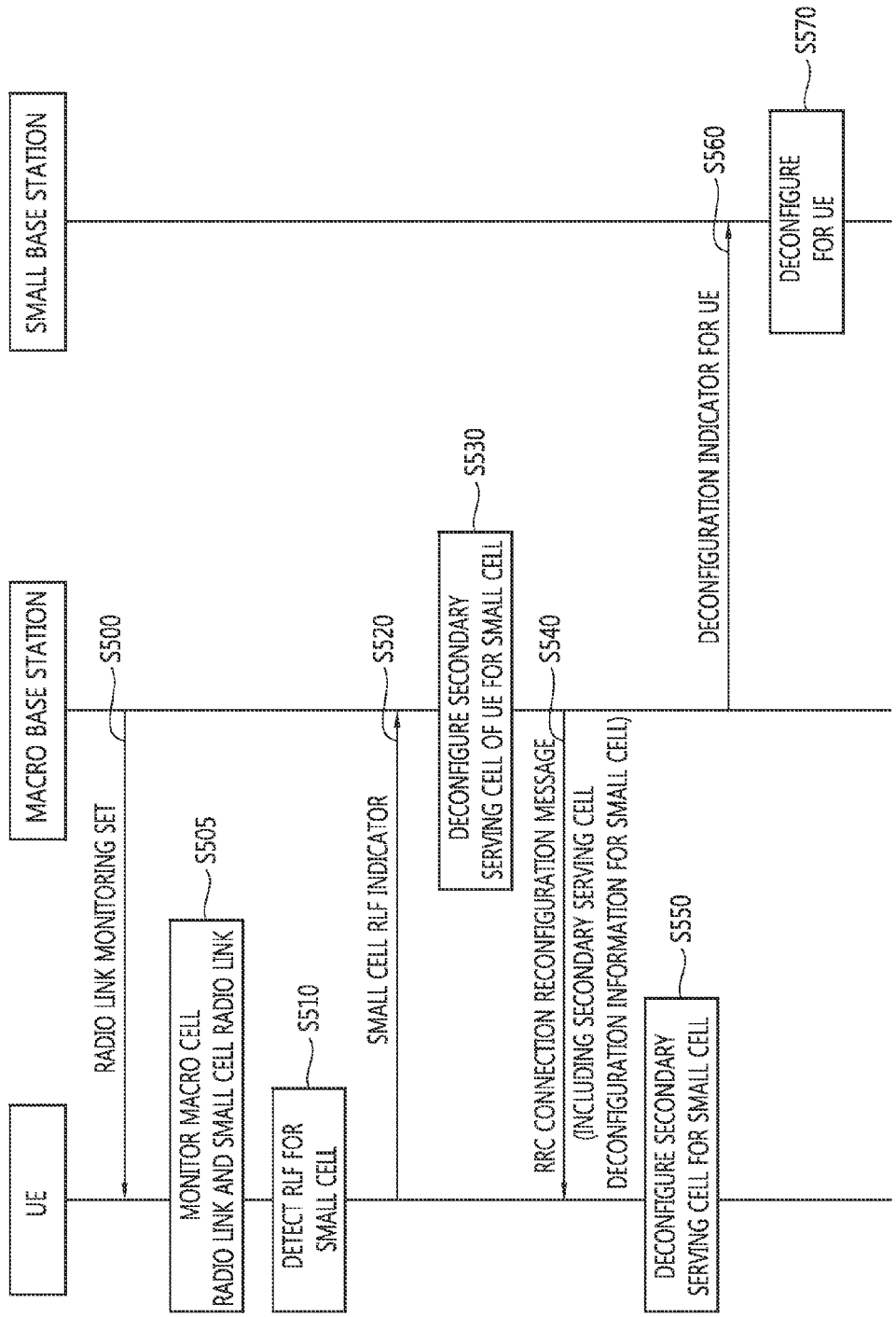
FIG. 5 illustrates an example of deconfiguring the corresponding small cell when the radio link failure occurs based on small cell wireless monitoring.

FIG. 5 illustrates an example of deconfiguring the corresponding small cell when the radio link failure occurs based on small cell wireless monitoring.

Referring to FIG. 5, the macro base station transmits a radio link monitoring set to the UE (S500). The radio link monitoring set may include macro cell radio link information and at least one small cell radio link information. The radio link monitoring set may be transmitted to the UE through the RRC dedicated message. Even when the UE does not receive the radio link monitoring set, the UE may basically monitor the radio link for maintaining the RRC connection. For example, the UE may monitor the radio link only to the macro cell. Alternatively, the UE may monitor cells corresponding to a frequency included in a configuration for measurement.

When information on a link which the UE is to measure or monitor is included in the radio link monitoring set to be transmitted to the UE, the UE needs to measure and monitor the link included in the corresponding link monitoring set.

The UE monitors each of the macro cell radio link and the small cell radio link (S505). The UE may monitor the macro cell radio link and the small cell radio link defined in the radio link monitoring set.

The UE detects that the small cell radio link RLF occurs (S510). In this case, the UE declares that the RLF occurs in the small cell radio link.

Since residual steps S520, S530, S540, S550, S560, and S570 may be performed similarly to procedures in steps S420, S430, S440, S450, S460, and S470, a detailed description thereof will be omitted.

Figure 6:
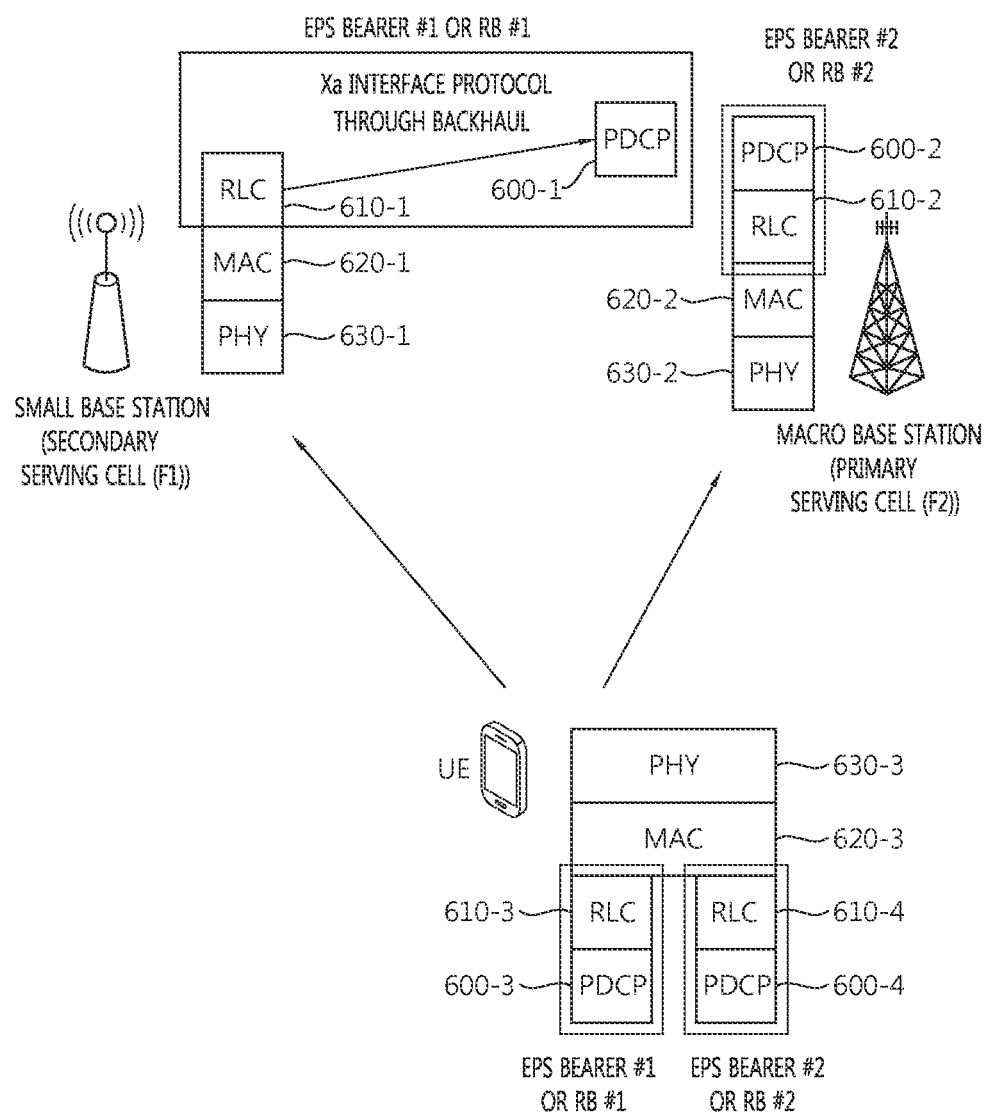
FIG. 6 illustrates one example of logical path configurations for a macro base station and a small base station under a dual connectivity situation of the UE.
Figure 7:
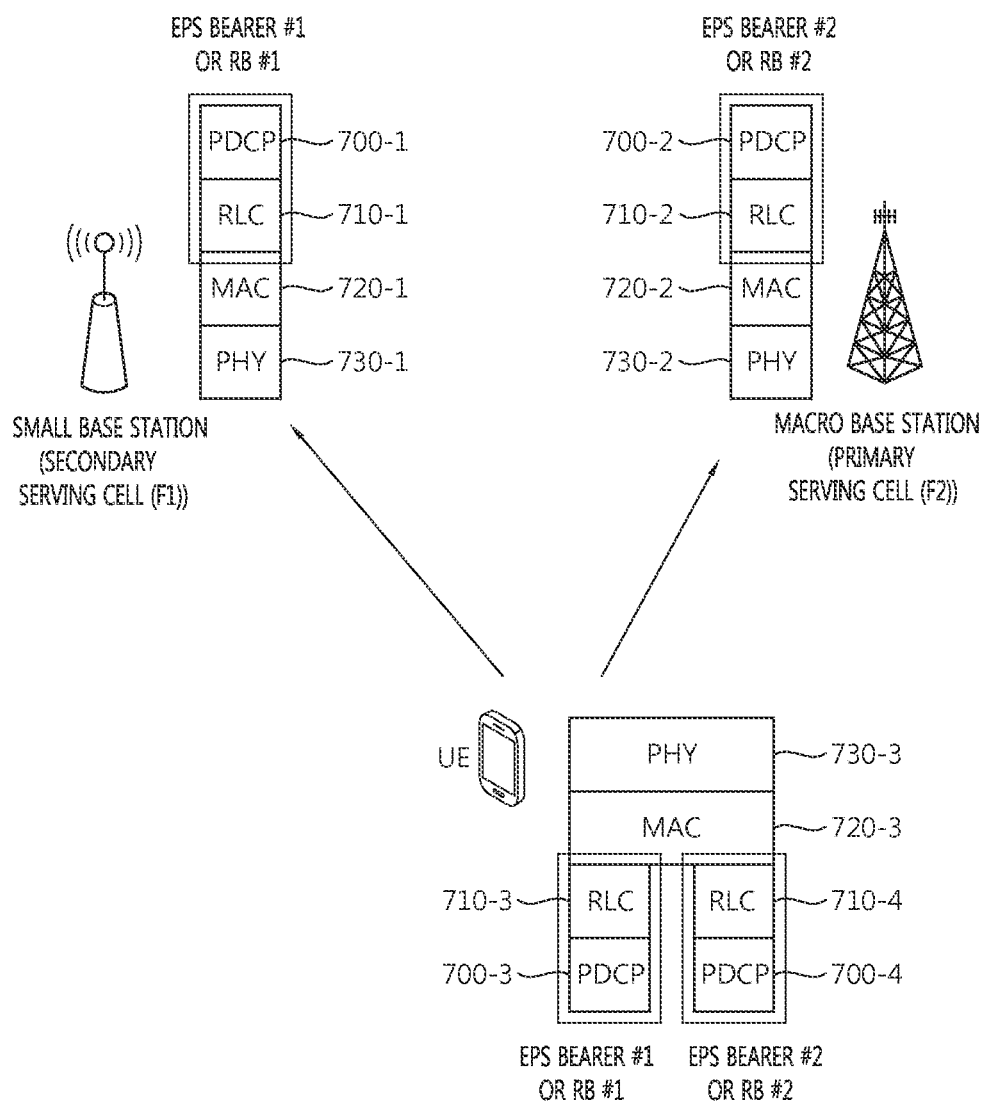
FIG. 7 illustrates another example of logical path configurations for the macro base station and the small base station under the dual connectivity situation of the UE.

Meanwhile, a logical path configuration applied to the dual connectivity situation of the UE according to an exemplary embodiment may be illustrated in FIG. 6 or 7 given below.

FIG. 6 illustrates one example of logical path configurations for a macro base station and a small base station under a dual connectivity situation.

Referring to FIG. 6, the small base station includes an RLC entity 610-1, an MAC entity 620-1, and a PHY layer 630-1 and the macro base station includes PDCP entities 600-1 and 600-2, an RLC entity 610-2, an MAC entity 620-2, and a PHY layer 630-2. Herein, the PDCP entity 600-1 and the RLC entity 610-1 correspond to EPS bearer #1 or RB #1 and the PDCP entity 600-2 and the RLC entity 610-2 correspond to EPS bearer #2 or RB #2.

The PDCP entity 600-1 of the macro base station is connected with the RLC entity 610-1 of the small base station by using an Xa interface protocol through backhaul. In this case, since the bearer is separated from a radio access network (RAN) layer, this case may be called RAN split. Herein, the Xa interface protocol may become an X2 interface protocol defined between the base stations in the LTE system.

The UE includes PDCP entities 600-3 and 600-4, RLC entities 610-3 and 610-4, an MAC entity 620-3, and a PHY layer 630-3. The PDCP entity 600-3 and the RLC entity 610-3 of the UE correspond to the EPS bearer #1 or the RB #1 and the PDCP entity 600-4 and the RLC entity 610-4 correspond to the EPS bearer #2 or the RB #2.

The UE may transmit/receive a data service to/from the small base station through the EPS bearer #1 or the RB #1 on the secondary serving cell using the F1 frequency band and transmit/receive the data service to/from the macro base station through the EPS bearer #2 or the RB #2 on the primary serving cell using the F2 frequency band.

FIG. 7 illustrates another example of logical path configurations for the macro base station and the small base station under the dual connectivity situation of the user equipment.

Referring to FIG. 7, the small base station includes a PDCP entity 700-1, an RLC entity 710-1, an MAC entity 720-1, and a PHY layer 730-1 and the macro base station includes a PDCP entity 700-2, an RLC entity 710-2, an MAC entity 720-2, and a PHY layer 730-2. Herein, the PDCP entity 700-1 and the RLC entity 710-1 correspond to the EPS bearer #1 or the RB #1 and the PDCP entity 700-2 and the RLC entity 710-2 correspond to the EPS bearer #2 or the RB #2.

In this case, since the respective EPS bearer are already separated from a core network and allocated to different base stations, this case may be called CN split.

The UE includes PDCP entities 700-3 and 700-4, RLC entities 710-3 and 710-4, an MAC entity 720-3, and a PHY layer 730-3. The PDCP entity 700-3 and the RLC entity 710-3 of the UE correspond to the EPS bearer #1 or the RB #1 and the PDCP entity 700-4 and the RLC entity 710-4 correspond to the EPS bearer #2 or the RB #2.

When the dual connectivity is configured as illustrated in FIG. 6 or 7, a plurality of RLC entities at the UE side are distinguished for each base station to be configured. However, in the RLC layer of the current UE, it may not be known to which cell of the macro cell and the small cell a retransmission error occurs through transmission. Therefore, a problem may occur when the RLF is determined based on the RLC PDU retransmission counter. For example, when the maximum retransmission threshold of the RLC PDU is 5 times, the number of transmission failure times to the macro cell and the number of transmission failure times to the small cell may be integrated and managed and in this case, when the RLF is individually determined in each of the macro cell radio link and the small cell radio link, the UE declares the RLF and the perform the RRC reestablishment procedure before reaching the maximum retransmission threshold of the RLC PDU. Therefore, in this case, according to an actual radio link status, the RLF occurs under a situation in which the RLF does not occur, there is a disadvantage that the actual radio link status cannot be reflected.

Accordingly, in order for the UE may to individually manage the macro cell radio link and the small cell radio link, the RLC entity for the macro cell and the RLC entity for the small cell need to be separately managed. As a result, the maximum retransmission threshold of the RLC PDU for the macro cell, the retransmission count of the RLC PDU for the macro cell, the maximum retransmission threshold of the RLC PDU for the small cell, and the retransmission count of the RLC PDU for the small cell need to be separately managed. Alternatively, although the maximum retransmission threshold of the RLC PDU and the retransmission count of the RLC PDU for the macro cell are configured as the same values in the macro cell and the small cell, the retransmission count of the RLC PDU needs to be separately performed in each of the macro cell or the small cell. This is to determine in which radio link of the macro cell radio link and the small cell radio link retransmission is performed.

In this case, the UE transmits the indicator to the higher layer to declare the RLF only when the retransmission count of the RLC PDU for the macro cell reaches the maximum retransmission threshold of the RLC PDU for the macro cell as shown in Table 3 and disregards the RLF without declaring the RLF when the retransmission count of the RLC PDU for the small cell reaches the maximum retransmission threshold of the RLC PDU for the small cell.

TABLE 3

-if (macro cell radio link with RRC) {
    RLC PDU RETX COUNT = maxRetxThresholdMacro:
      - Then, indicating that maximum retransmission is reached to higher layer.
}
- if (small cell radio link without RRC) {
    RLC PDU RETX COUNT = maxRetxThresholdSmall
      - Then, not indicating that maximum retransmission is reached to higher layer However, in the example described in Table 3, it is assumed that the UE maintains the RRC connection through the macro cell and in the case where the UE maintains the RRC connection through the small cell, the UE may declare the RLF only when the RLF situation for the small cell occurs and disregard the RLF when the RLF situation for the other cell occurs. The UE may not declare the RLF with respect to the RLF situation which occurs in a cell without the RRC connection.

The reason is that when the dual connectivity is considered, the problem occurs in the small cell, but it is not efficient to perform an operation such as newly reestablishing the connection because the UE declares the RLF under a situation in which the macro cell is still available.

Figure 8:
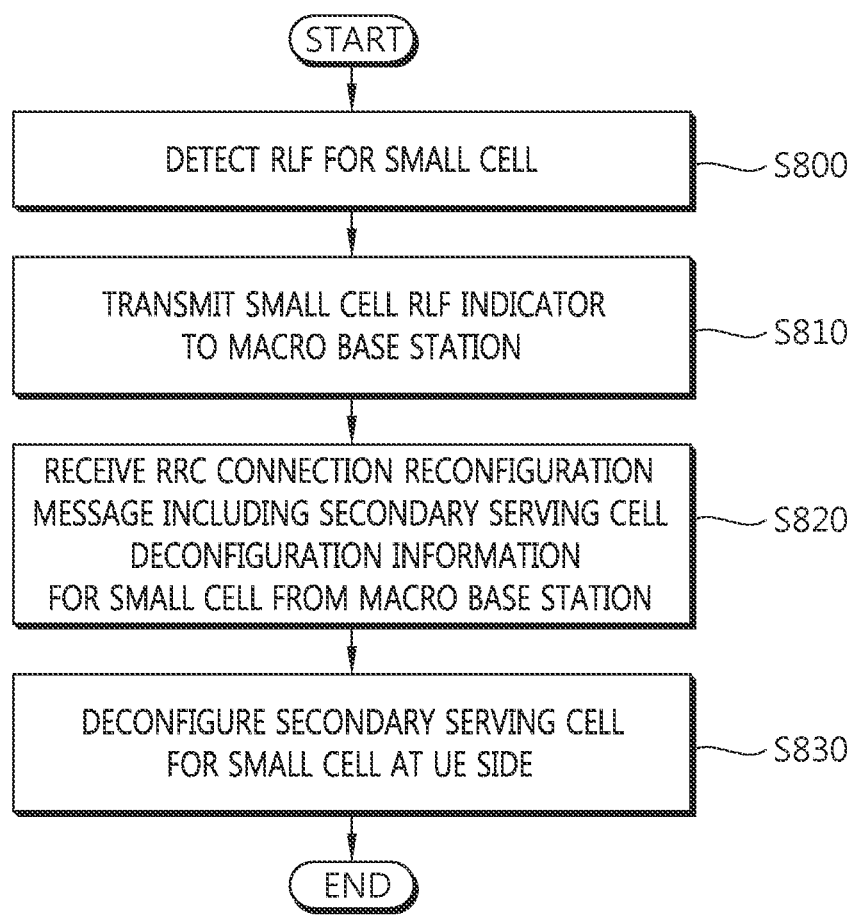
FIG. 8 illustrates a method for radio link control performed by UE in a wireless communication system supporting dual connectivity according to an exemplary embodiment.

FIG. 8 illustrates a method for radio link control performed by a UE in a wireless communication system supporting dual connectivity according to an exemplary embodiment.

Referring to FIG. 8, the UE detects the small cell RLF (S800). As one example, the UE may determine whether the small cell RLF situation occurs through monitoring the radio link for the small cell. As another example, the UE may determine whether the small cell RLF situation occurs through the RLC PDU retransmission count for the small cell.

When the small cell RLF is detected, the UE transmits the small cell RLF indicator to the macro base station (S810). The small cell RLF indicator is information indicating that the RLF situation occurs in the small cell radio link. Meanwhile, when the small cell RLF is detected, the UE may perform the following operation together with step S810 or without performing steps S810 and S820. As one example, the UE may stop uplink transmission to the small cell based on the radio link failure (RLF) for the small cell. When the uplink transmission to the small cell stops, the UE may stop uplink transmission of the PUSCH, the PUCCH, the SRS, and the like. As another example, the UE may deactivate the small cell based on the radio link failure (RLF) for the small cell. In this case, the UE may deactivate the small cell without a separate deactivation indicator from the base station. As yet another example, the UE may disregard the RLF without declaring the RLF in the case of the RLF for the small cell.

The UE receives an RRC connection reconfiguration message including secondary serving cell deconfiguration information for the small cell from the macro base station (S820). The UE performs reconfiguration of the RRC related parameter of deconfiguring the secondary serving cell for the small cell at the UE side based on the secondary serving cell deconfiguration information for the small cell. In this case, the UE may transmit an RRC connection reconfiguration complete message to the macro base station.

Figure 9:
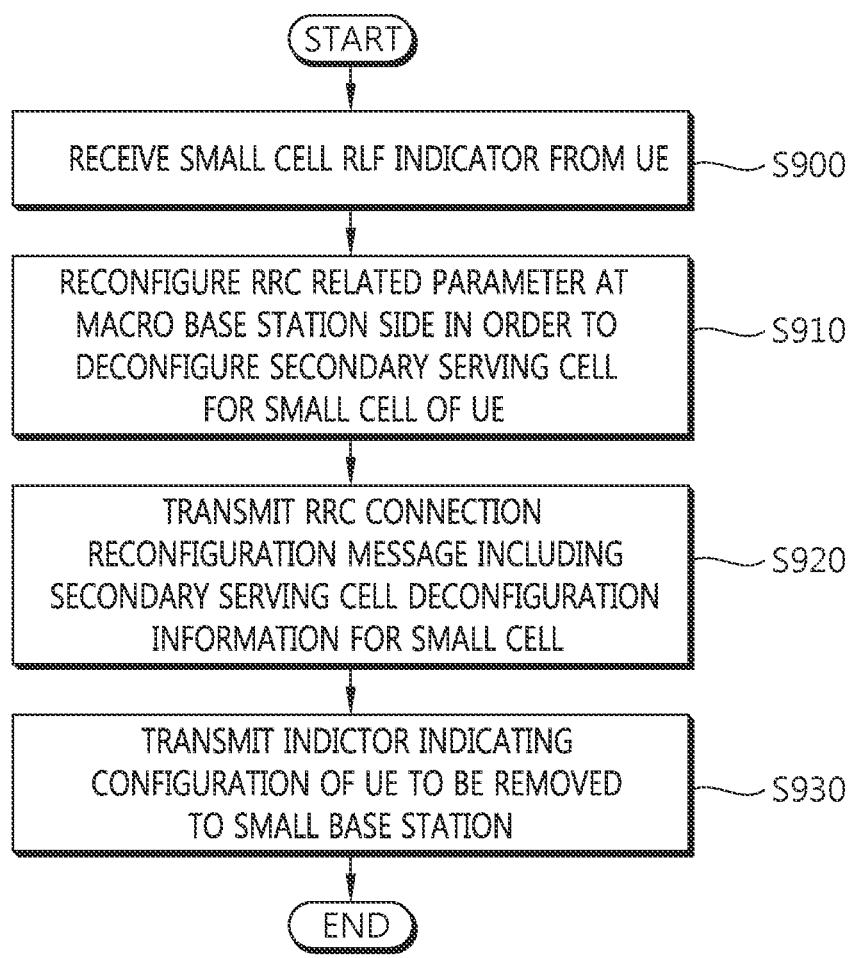
FIG. 9 illustrates a method for radio link control performed by a macro base station in a wireless communication system supporting dual connectivity according to an exemplary embodiment.

FIG. 9 illustrates a method for radio link control performed by a macro base station in a wireless communication system supporting dual connectivity according to an exemplary embodiment.

Referring to FIG. 9, the macro base station receives the small cell RLF indicator from the UE (S900). The small cell RLF indicator is information indicating that the RLF situation occurs in the small cell radio link.

The macro base station reconfigures the RRC related parameter at the macro base station side in order to deconfigure the secondary serving cell for the small cell in the UE (S910). The macro base station may reconfigure the RRC related parameter in order to deconfigure the secondary serving cell for the small cell based on the small cell RLF indicator.

The macro base station transmits the RRC connection reconfiguration message including the secondary cell deconfiguration information for the small cell to the UE (S920). In this case, the macro base station may receive the RRC connection reconfiguration complete message corresponding to the RRC connection reconfiguration message from the UE.

The macro base station transmits an indicator that indicates the small base station to remove the configuration for the UE (S930). The macro base station may transmit the indicator to the base station after receiving the RRC connection reconfiguration complete message from the UE and immediately transmit the indicator to the small base station regardless of receiving the RRC connection reconfiguration message.

Figure 10:
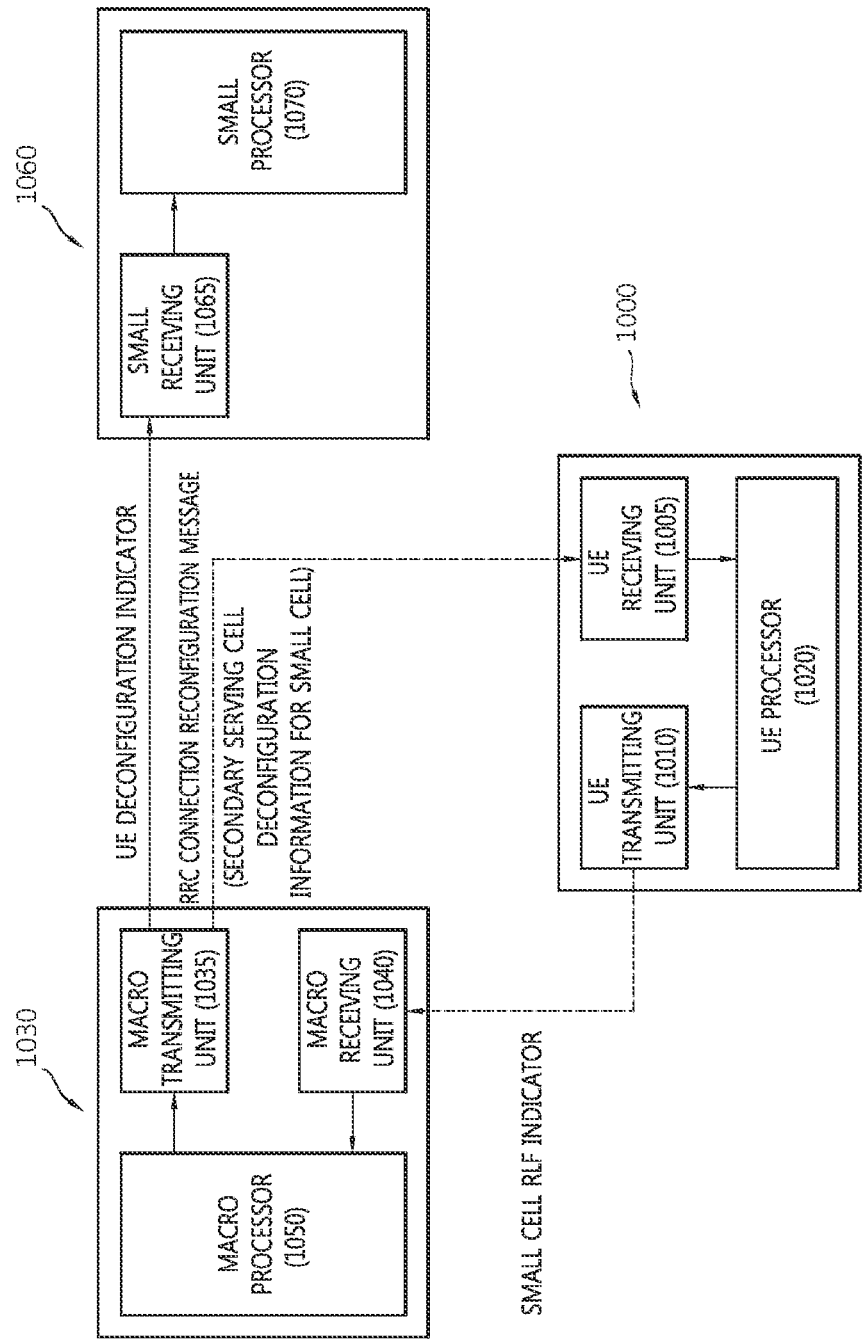
FIG. 10 is a block diagram of UE, a macro base station, and a small base station in a wireless communication system supporting dual connectivity according to an exemplary embodiment.

FIG. 10 is a block diagram of a user equipment, a macro base station, and a small base station for performing radio link control in a wireless communication system supporting dual connectivity according to an exemplary embodiment.

Referring to FIG. 10, the UE 1000 according to an exemplary embodiment may be configured to be dually connected with a macro base station 1030 and a small base station 1060. The UE 1000 includes a UE receiving unit 1005, a UE transmitting unit 1010, and a UE processor 1020. The UE processor 1020 performs a function and control required to implement the features of an exemplary embodiment described above.

The UE processor 1020 performs RLF detection. As one example, the UE processor 1020 may determine whether the RLF situation occurs through monitoring the radio link. As another example, the UE processor 1020 may determine whether the RLF situation occurs through the RLC PDU retransmission count. In this case, the UE processor 1020 may perform the RLF detection by distinguishing the radio link for the macro cell and the radio link for the small cell. That is, the UE processor 1020 may determine whether the macro cell RLF situation occurs through monitoring the radio link of the macro cell and determine whether the macro cell RLF situation occurs through the RLC PDU retransmission count for the macro cell. Further, the UE processor 1020 may determine whether the small cell RLF situation occurs through monitoring the radio link of the small cell and determine whether the small cell RLF situation occurs through the RLC PDU retransmission count for the small cell.

The UE processor 1020 may declare the RLF and perform the RRC connection reestablishment procedure when the macro cell RLF is detected.

The UE processor 1020 may stop uplink transmission to the small cell when the small cell RFL is detected. In this case, the UE processor 1020 may stop uplink transmission of a PUSCH, a PUCCH, an SRS, and the like, which is performed by the UE transmitting unit 1010. Further, the UE processor 1020 may deactivate the small cell when the small cell RFL is detected. In this case, even when the UE receiving unit 1005 does not receive a deactivation indicator from the macro base station 1030 or the small base station 1060, the UE processor 1020 may autonomously deactivate the small cell (that is, the secondary serving cell for the small cell) at the UE side. Further, the UE processor 1020 may disregard the RLF without declaring the RLF when the small cell RFL is detected. In addition, the UE processor 1020 generates the small cell RLF indicator when the small cell RFL is detected. The small cell RLF indicator is information indicating that the RLF situation occurs in the small cell radio link.

The UE transmitting unit 1010 transmits the small cell RLF indicator to the macro base station 1030.

The UE receiving unit 1005 receives the RRC connection reconfiguration message including the secondary serving cell deconfiguration information for the small cell from the macro base station. The UE processor 1030 performs reconfiguration of the RRC associated parameter of deconfiguring the secondary serving cell for the small cell at the UE side based on the secondary serving cell deconfiguration information for the small cell. In this case, the UE processor 1020 generates the RRC connection reconfiguration complete message to transmit the generated RRC connection reconfiguration complete message to the macro base station 1030 through the UE transmitting unit 1010.

Meanwhile, the UE receiving unit 1050 may receive the radio link monitoring set from the macro base station 1030. The UE receiving unit 1050 may receive the radio link monitoring set through the RRC dedicated message. The radio link monitoring set may include macro cell radio link information and at least one small cell radio link information. The UE processor 1020 may perform macro cell radio link monitoring and small cell radio link monitoring based on the radio link monitoring set. The UE processor 1020 may perform the macro cell radio link monitoring and the small cell radio link monitoring regardless of the radio link monitoring set.

The macro base station 1030 includes a macro transmitting unit 1035, a macro receiving unit 1040, and a macro processor 1050.

The macro receiving unit 1040 receives the small cell RLF indicator from the UE.

The macro processor 1050 may deconfigure the secondary serving cell of the UE 1000 for the small cell based on the small cell RLF indicator. In this case, the macro processor 1050 reconfigures the RRC related parameter at the macro base station side in order to deconfigure the secondary serving cell for the small cell and generates the RRC connection reconfiguration message including the secondary serving cell deconfiguration information for the small cell.

The macro transmitting unit 1035 transmits the RRC connection reconfiguration message to the UE 1000. The macro receiving unit 1040 may receive the RRC connection reconfiguration complete message corresponding to the RRC connection reconfiguration message from the UE 1000.

Further, the macro processor 1050 generates an indicator to the cell configuration for the UE 1000 to be removed transmits the generated indicator to the small base station 1060 through the macro transmitting unit 1035.

In addition, the macro processor 1050 may generate the radio link monitoring set and transmit the generated radio link monitoring set to the UE 1000 through the macro transmitting unit 1035.

The small base station 1360 includes a small receiving unit 1365 and a small processor 1370.

The small receiving unit 1365 receives from the macro base station 1030 the indicator to indicate the cell configuration for the UE 1000 to be removed.

The small processor 1365 removes the configuration for the UE 1000 at the small base station 1360 side based on the indicator. That is, the small processor 1365 deletes context information for the UE 1000.

The above description is illustrative purpose only and various modifications and transformations become apparent to those skilled in the art within a scope of an essential characteristic of the present inventive concept. Accordingly, the various embodiments disclosed herein are not intended to limit the technical spirit but describe with the scope of the technical spirit of the present invention. The scope of the present invention should be interpreted by the appended claims and all technical spirit in the equivalent range is intended to be embraced by the appended claims.

What is claimed is:

1. A user equipment for performing radio link control in a wireless communication system supporting dual connectivity, the user equipment comprising:
a processor configured to detect a radio link failure (RLF) for a secondary serving cell provided by a secondary base station (secondary eNB, SeNB) and to generate an RLF indicator indicating occurrence of the RLF for the secondary serving cell; and
a transmitting unit configured to transmit the RLF indicator to a master base station (master eNB, MeNB) connected through radio resource control (RRC),
wherein the RLF indicator comprises a cell identifier (cell ID), and the user equipment stops uplink transmission of physical uplink shared channel (PUSCH), physical uplink control channel (PUCCH), and sounding reference signal (SRS) to the secondary serving cell, based on the RLF for the secondary serving cell.

2. The user equipment of claim 1, further comprising:
a receiving unit configured to receive an RRC connection reconfiguration message including secondary serving cell deconfiguration information for the secondary serving cell from the master base station,
wherein the processor is configured to deconfigure the secondary serving cell at the user equipment side based on the secondary serving cell deconfiguration information.

3. The user equipment of claim 2, further comprising:
a receiving unit configured to receive a radio link monitoring set including radio link information for a primary serving cell provided by the master base station and radio link information for the secondary serving cell provided by the small base station from the master base station,
wherein the processor is configured to detect the RLF for the secondary serving cell based on the radio link monitoring set.

4. The user equipment of claim 1, wherein the processor is configured to detect the RLF for the secondary serving cell through radio link monitoring for the secondary serving cell.

5. The user equipment of claim 1, wherein the processor is configured to detect the RLF for the secondary serving cell based on a radio link control protocol data unit (RLC PDU) retransmission count for the secondary serving cell.

6. A master base station for performing radio link control in a wireless communication system supporting dual connectivity, the master base station comprising:
a receiving unit configured to receive a radio link failure (RLF) indicator indicating that a radio resource failure for a secondary serving cell provided to a user equipment occurs from a secondary base station from the user equipment;
a processor configured to generate a radio resource control (RRC) connection reconfiguration message including secondary serving cell deconfiguration information for the secondary serving cell based on the RLF indicator; and
a transmitting unit configured to transmit the RRC connection reconfiguration message to the user equipment,
wherein the RLF indicator comprises a cell identifier (cell ID), and the user equipment stops uplink transmission of physical uplink shared channel (PUSCH), physical uplink control channel (PUCCH), and sounding reference signal (SRS) to the secondary serving cell, based on the RLF for the secondary serving cell.

7. The base station of claim 6, wherein:
the processor is configured to generate an indicator indicating the secondary base station to deconfigure the secondary serving cell for the user equipment, and
the transmitting unit is configured to transmit the indicator to the secondary base station.

8. The base station of claim 6, wherein:
the processor is configured to generate a radio link monitoring set including radio link information for a primary serving cell provided by the master base station and radio link information for the secondary serving cell provided by the small base station,
the transmitting unit is configured to transmit the generated radio link monitoring set to the user equipment, and
the receiving unit is configured to receive the RLF indicator generated based on the radio link monitoring set.

9. A method for radio link control by a user equipment which is dually connected to a master base station and a secondary base station, the method comprising:
detecting a radio link failure (RLF) for a secondary serving cell provided by a secondary base station;
generating an RLF indicator indicating occurrence of the RLF for the secondary serving cell when the RLF for the secondary serving cell is detected; and
transmitting the RLF indicator to the master base station connected through radio resource control (RRC),
wherein the RLF indicator comprises a cell identifier (cell ID), and the user equipment stops uplink transmission of physical uplink shared channel (PUSCH), physical uplink control channel (PUCCH), and sounding reference signal (SRS) to the secondary serving cell, based on the RLF for the secondary serving cell.

10. The method of claim 9, further comprising:
receiving an RRC connection reconfiguration message including secondary serving cell deconfiguration information for the secondary serving cell from the master base station; and
deconfiguring the secondary serving cell at the user equipment side based on the secondary serving cell deconfiguration information.

11. The method of claim 9, wherein the detection of the RLF for the secondary serving cell is performed based on radio link monitoring for the secondary serving cell.

12. The method of claim 11, further comprising:
receiving a radio link monitoring set including radio link information for a primary serving cell provided by the master base station and radio link information for the secondary serving cell provided by the small base station from the master base station,
wherein the radio link monitoring for the secondary serving cell is performed based on the radio link monitoring set.

13. The method of claim 9, wherein the detection of the RLF for the secondary serving cell is performed based on a radio link control protocol data unit (RLC PDU) retransmission count for the secondary serving cell.

* * * * *